United States Patent [19]

Beerbaum

[11] Patent Number: 5,127,575

[45] Date of Patent: Jul. 7, 1992

[54] SUPERVISORY CONTROL UNIT FOR ELECTRICAL EQUIPMENT

[76] Inventor: Ronald H. Beerbaum, 1438 Bucks Hill Rd., Southbury, Conn. 06488

[21] Appl. No.: 685,199

[22] Filed: Apr. 15, 1991

[51] Int. Cl.⁵ .................................................. F23N 5/20
[52] U.S. Cl. .................................. 236/46 R; 165/11.1; 236/47
[58] Field of Search .............. 236/46 R, 47; 165/11.1, 165/12

[56] References Cited

U.S. PATENT DOCUMENTS

| 4,027,171 | 5/1977 | Browder et al. | 236/46 R |
| 4,462,540 | 7/1984 | Dytch | 236/47 |
| 4,623,969 | 11/1986 | Bensoussan | 236/47 X |

*Primary Examiner*—William E. Wayner
*Attorney, Agent, or Firm*—Lawrence Hager

[57] ABSTRACT

A supervisory control unit for lighting, heating and air conditioning equipment containing an occupancy sensor, a temperature limit detector, an entry delay detector and incorporating time cycle operation intended to limit the use of said equipment for the purposes of energy conservation.

The unit outputs low voltage control signals that by means of external switching devices makes or interrupts the power and/or control signals normally connected to the lighting, heating and air conditioning equipment, thereby limiting the use of said equipment unless certain criteria are met.

13 Claims, 7 Drawing Sheets

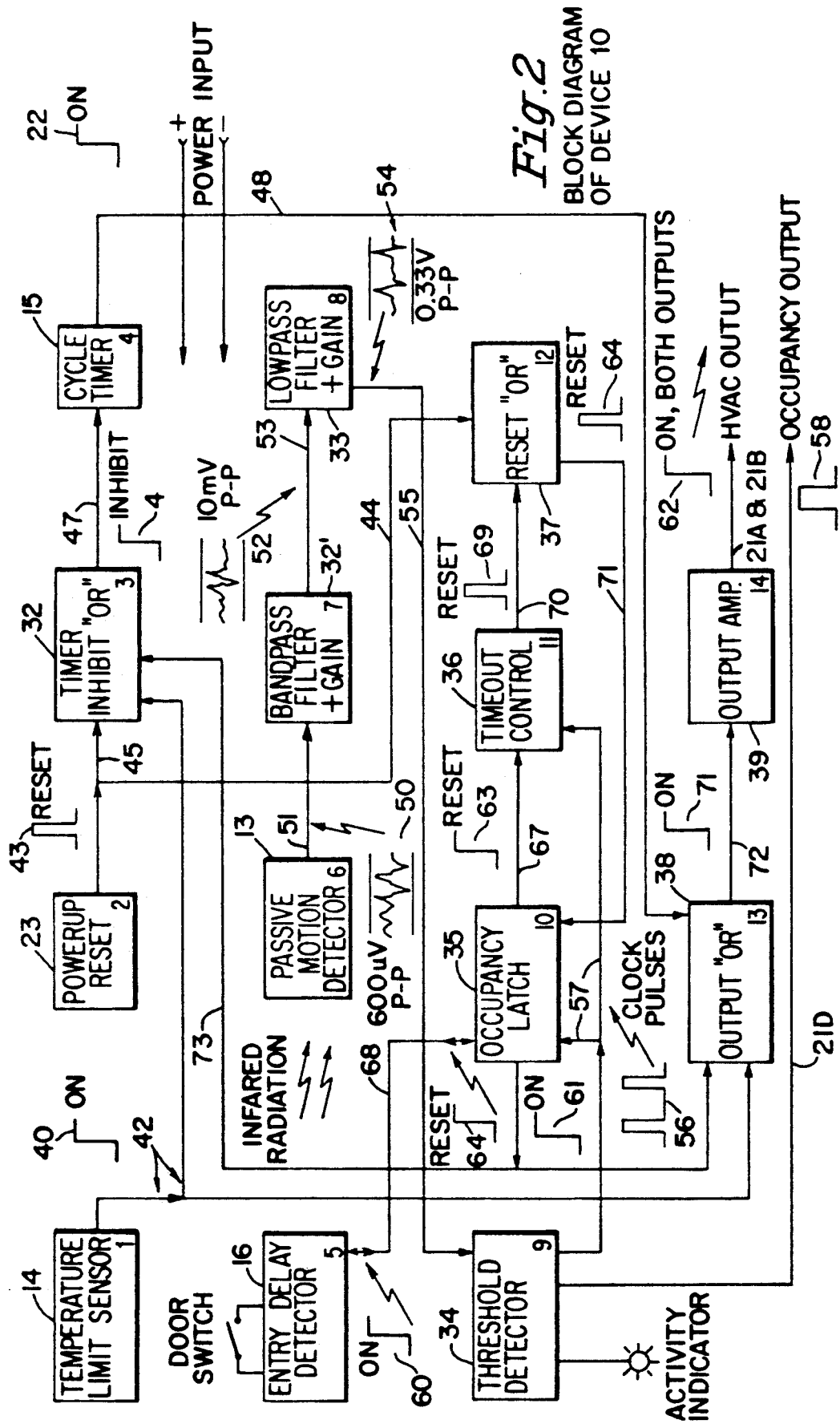

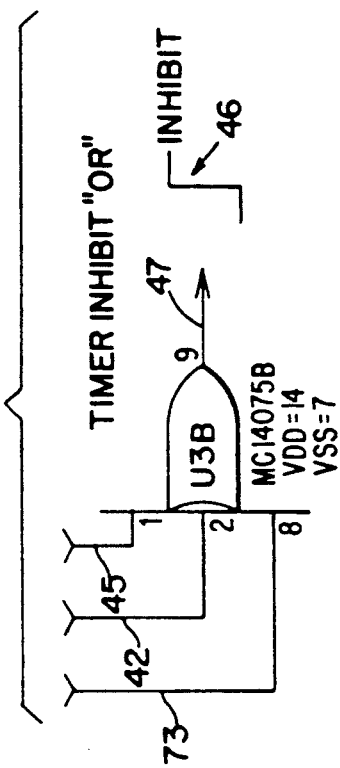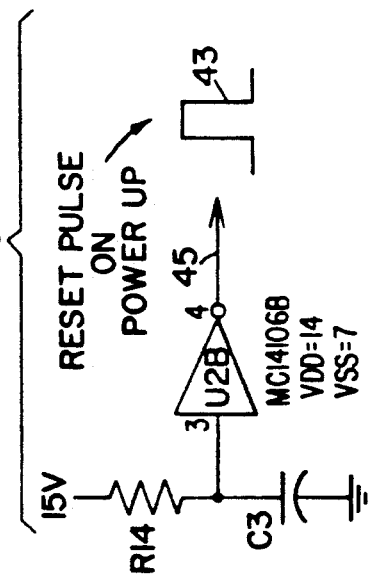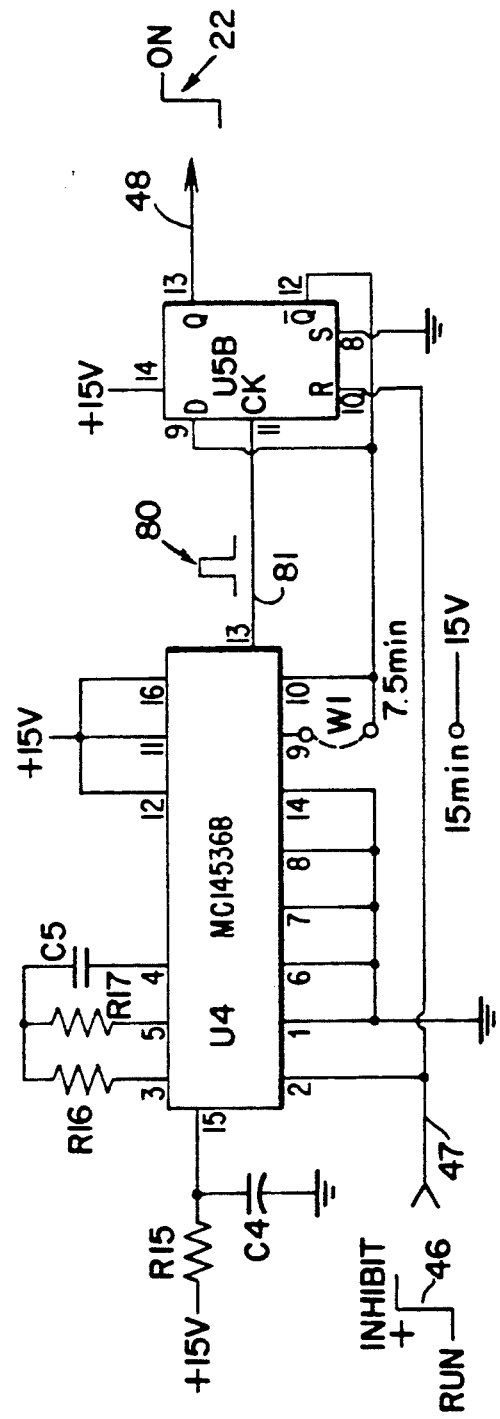

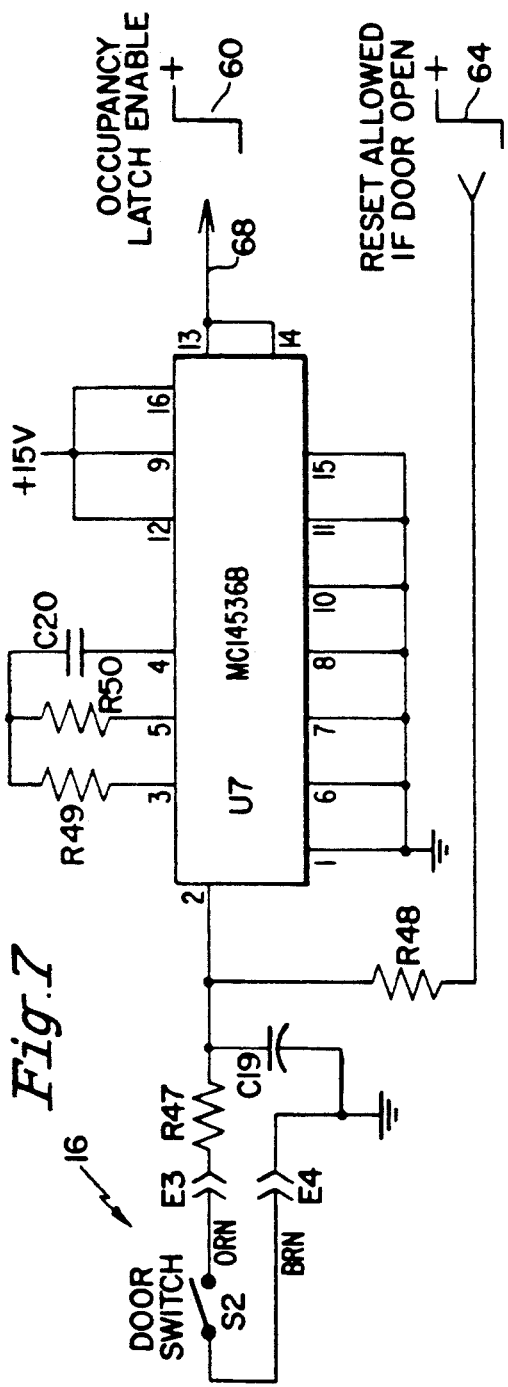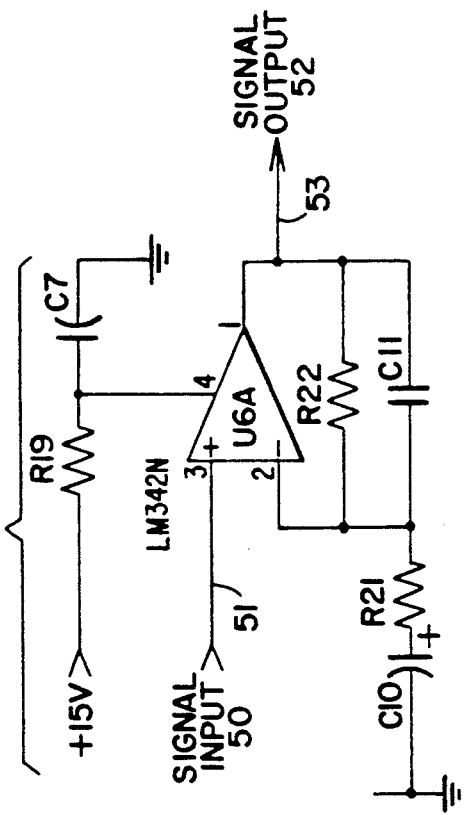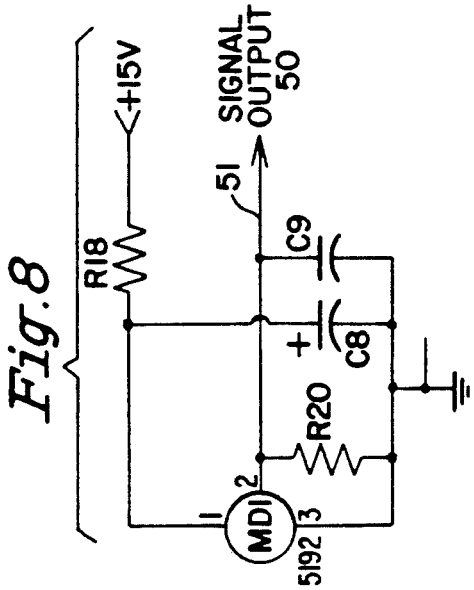

LOWPASS FILTER PLUS GAIN

TIMEOUT CONTROL

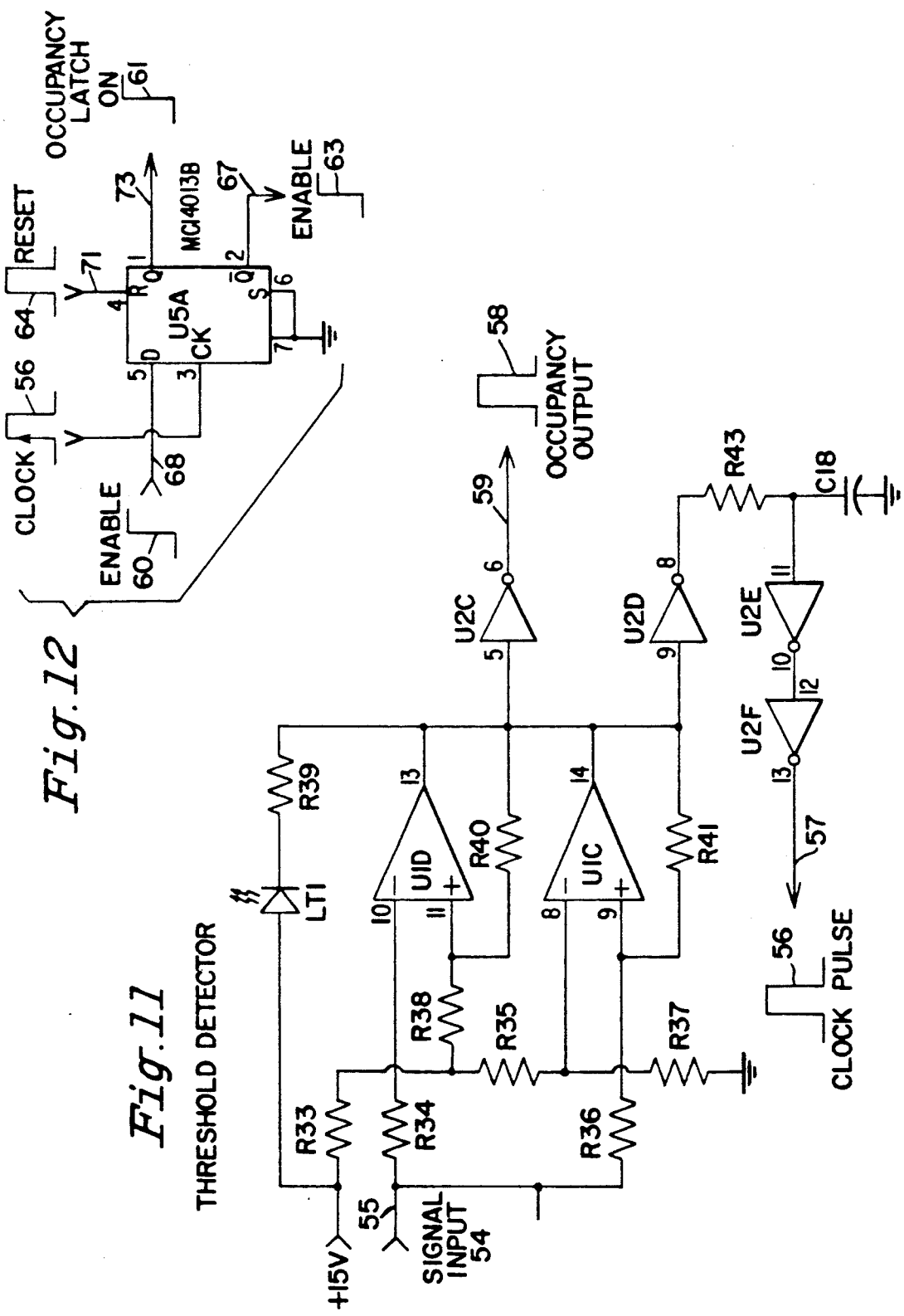

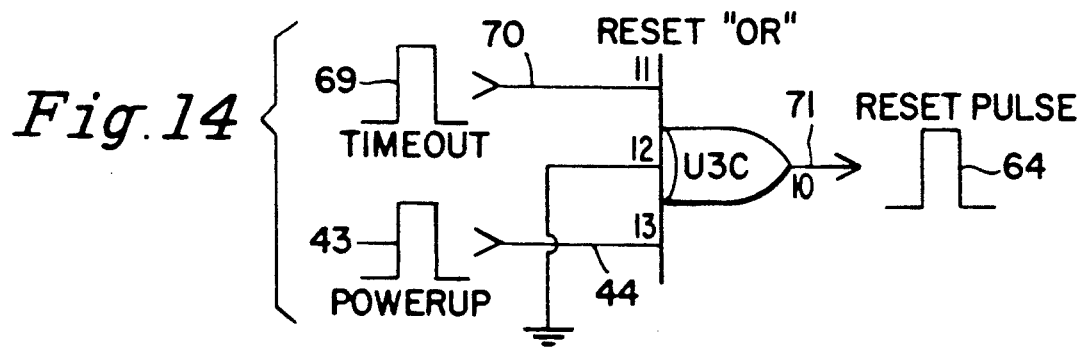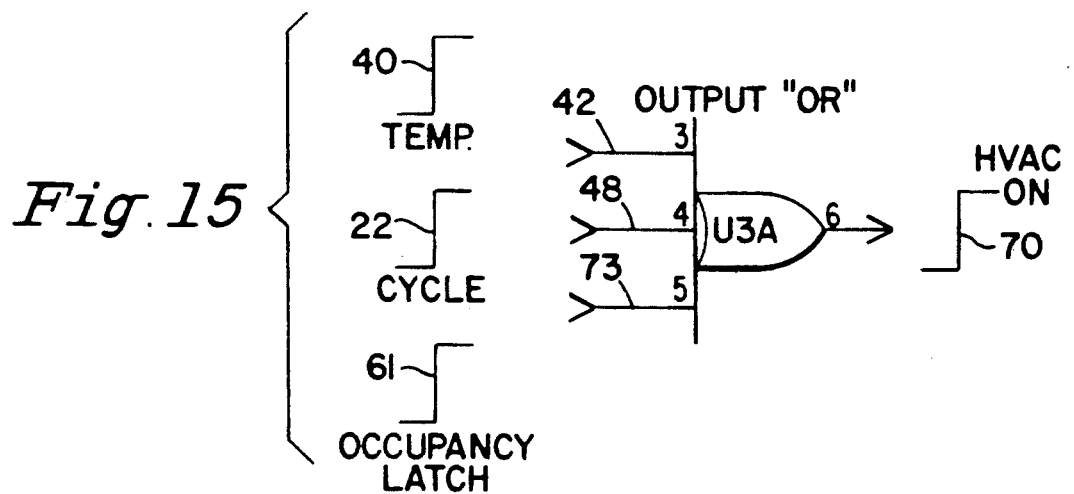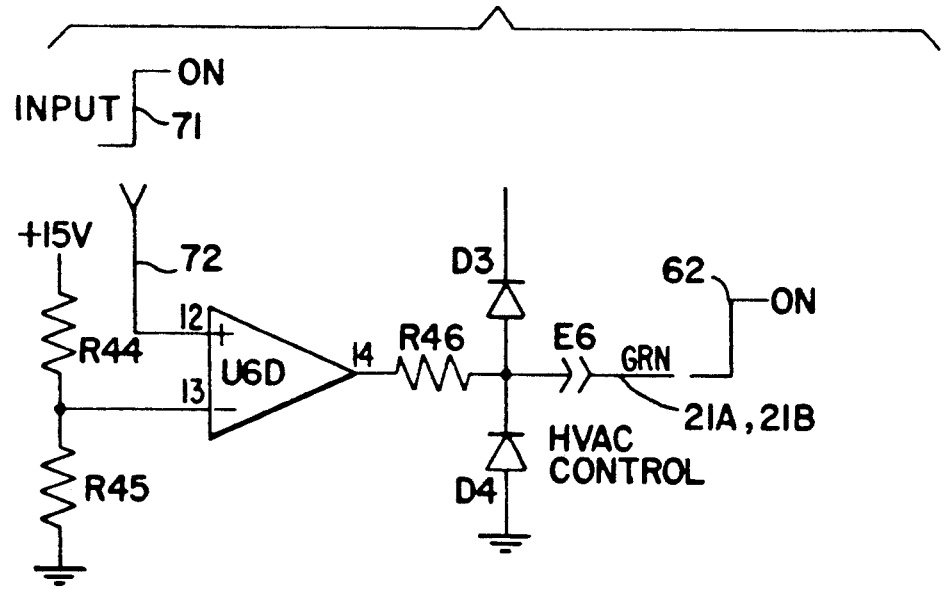

SUPERVISORY CONTROL UNIT FOR ELECTRICAL EQUIPMENT

This invention relates to the control of lighting, heating and air conditioning equipment used in environmental conditioning of space within a room as applicable to, but not limited to, office buildings and hotels. The purpose of this invention is to conserve electrical energy, while maintaining an acceptable comfort level within the room or space.

BACKGROUND OF THE INVENTION

Typically, lighting is controlled by manual on/off or dimming switches mounted on walls or integral to the lighting fixtures; and heating and air conditioning is controlled by on/off switches and thermostats also integrally or wall mounted. These controls are set by the occupants within a room to the appropriate comfort level. However, when the occupants leave the space, the controls are most often left set to that comfort level. This condition leads to considerable waste of electrical energy through the lighting, heating or air conditioning of the unoccupied space. While it may not be a problem to automatically turn the lights off in the space, it has been customary not to completely turn off the heating and air conditioning within the space because of possible damage to the real estate and possible extreme discomfort to the returning occupants.

Prior art has been applied to the control of lighting equipment by means of various types of occupancy sensors, whereby the lights are automatically turned off when the occupants leave the space. Prior art has also been applied to the heating and air conditioning equipment in the form of timers and computers that automatically schedule the heating and air conditioning on a temporal basis. However, temporal control does not lend itself to irregular or sporadic occupancy of a space as is common in a hotel room or offices. The prior art in occupancy sensors does not lend itself to the application to heating and air conditioning, because it will completely turn the equipment off with the aforementioned consequences.

The present invention improves upon and solves the prior art problems in several ways. Firstly, it improves the occupancy sensor with additional signal processing to extract the occupancy signal in a noisy environment. Secondly, it adds digital timing control that greatly improves settability and stability with aging. Furthermore, the invention combines the lighting function with the control of the heating and air conditioning equipment.

There are several problems that heretofore precluded prior art device application of occupancy sensors to the control of heating and air conditioning equipment that are overcome by the present invention. Firstly, short cycling of electric motors in the equipment was a substantial problem not resolved by prior art. If the motors are frequently turned on and off, their life will be shortened due to heating from inrush current. Prior art occupancy sensors did not include provisions to limit short cycling of the controlled equipment. Secondly, there is the problem of temperature extremes as mentioned above and an adjunct problem of humidity control. If the air conditioning is totally turned off, the space may become too humid and cause real estate damage and excessive discomfort to the occupants upon their return to the space. These prior art problems are solved by the present invention with the addition of circuitry that: Resets the device to the off state when power is lost, which is the reverse of the prior art. The addition of a temperature limit detector, a digital cycle timer and entry delay detector are provided to moderate temperature and humidity fluctuations and limit short cycling, while allowing the lighting function with the control of the heating and air conditioning equipment, thereby enabling the temperature to range above or below the comfort level established by the thermostat settings.

BRIEF DESCRIPTION OF THE DRAWINGS

Other objects and advantages of the present invention will be evident from the following detailed description when read in conjunction with the accompanying drawings which illustrate the preferred embodiment.

FIG. 2 is a schematic block diagram of a supervisory control unit in accordance with the present invention;

FIG. 4 is a circuit diagram of a power up circuit utilized in accordance with the present invention;

FIG. 5 is a circuit diagram of a timer inhibit "OR" utilized in accordance with the present invention;

FIG. 6 is a circuit diagram of a cycle timer utilized in accordance with the present invention;

FIG. 7 is a circuit diagram of an entry delay detector utilized in accordance with the present invention;

FIG. 8 is a circuit diagram of a passive motion detector utilized in accordance with the present invention;

FIG. 9 is a circuit diagram of a bandpass filter plus gain utilized in accordance with the present invention;

FIG. 11 is a circuit diagram of a threshold detector utilized in accordance with the present invention;

FIG. 12 is a circuit diagram of a occupancy latch utilized in accordance with the present invention;

FIG. 14 is a circuit diagram of a reset "OR" utilized in accordance with the present invention;

FIG. 15 is a circuit diagram of an output "OR" utilized in accordance with the present invention;

FIG. 16 is a circuit diagram output amplifier utilized in accordance with the present invention.

Figure 1:
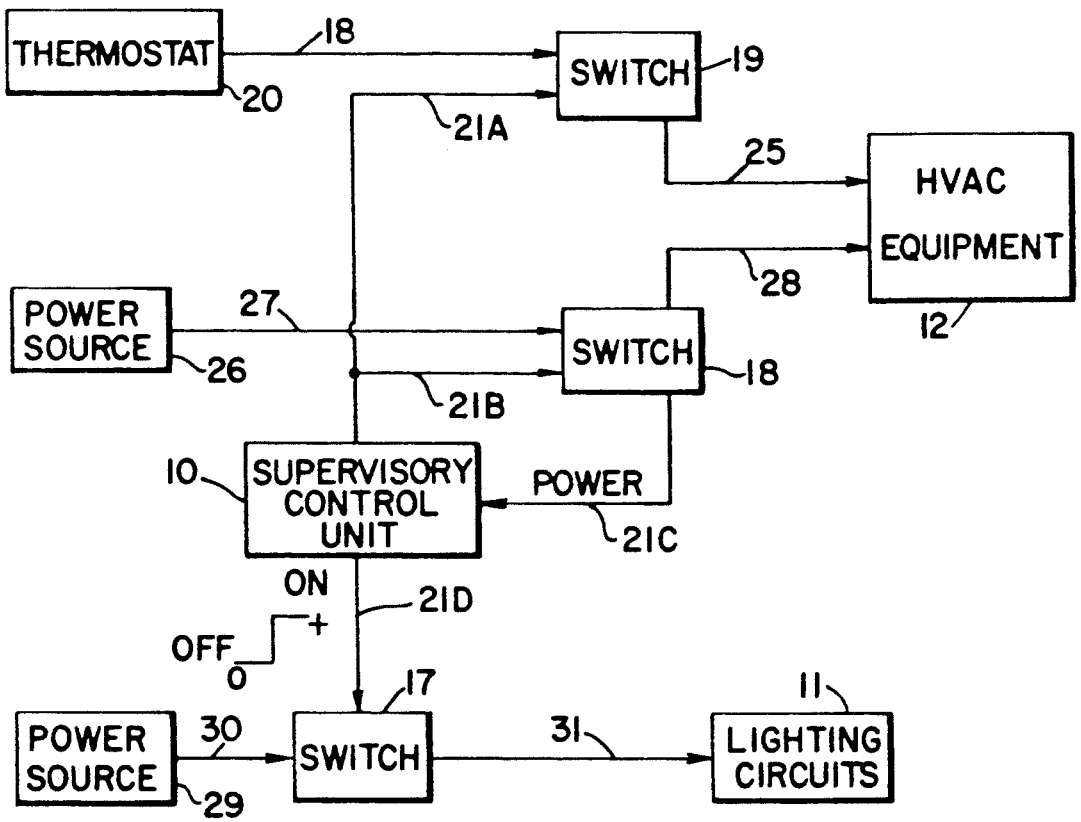
FIG. 1 is a schematic application block diagram utilizing a supervisory control unit in accordance with the present invention.

Accordingly, it is an object of the present invention to provide a new and improved discrete control unit for electrical equipment.

Another object of the present invention is to provide a new and improved discrete control unit to control the use of lighting and/or heating and/or air conditioning equipment for reducing system energy consumption, while maintaining a reasonable comfort level for the occupants.

Another object of the present invention is to provide a new and improved discrete control circuit means for control of interior environmental space, having a cycle timer function which produces a control signal that allows the heating and air conditioning equipment to operate a selected on/off duty cycle.

Another object of the present invention is to provide a discrete environmental equipment control unit having a temperature limit sensor to constrain the functioning of the heating and/or air conditioning equipment to maintain the environment between an upper and lower preset limits.

Another object of the present invention is to provide a control unit that provides improved occupancy sensing to extract the occupancy signal in a noisy environment.

Another object of the present invention is to provide a control unit with digital timing control having improved setting and stability capability with aging.

Another object of the present invention is to provide a discrete supervisory control unit for control of a structures heating and/or air conditioning and/or lighting, which includes an infrared occupancy detector and a temperature limit detector and a time cycle means and an entry delay means.

The present invention involves a novel combination of features and circuitry combined in such a way as to afford a very efficient, cost effective, solution to the difficulties and problems encountered with the prior art.

SUMMARY OF THE INVENTION

A supervisory control unit having particular utility for controlling lighting and/or heating and/or air conditioning equipment used in environmental conditioning, comprising:
- an occupant detection circuit means (13, 16, 32, 33, 34, and 35) for detecting the presence of one or more persons within the area being environmentally conditioned, and for providing a signal indicative thereof;
- a temperature limit sensor circuit means (14) operatively coupled to the occupant detection circuit means and preselected environmental conditioning equipment for moderating the controlled environmental fluctuations;
- a time cycle operation circuit means (21) operatively coupled to selected environmental conditioning equipment for controlling the environmental conditioning equipment to operate a selected on/off duty-cycle; and
- an entry delay detection circuit (24) operatively coupled to the occupant detection circuit means to disable the occupant detection circuit means while a door is open.

DETAILED DESCRIPTION OF THE INVENTION

Generally speaking, the electronic device (10) in accordance with the invention, combines in one supervisory control unit, the following functions, to limit, control or preclude the lighting (11), heating and air conditioning equipment (12) activation for the purpose of reducing system energy consumption, while maintaining a reasonable comfort level for the occupants.

Basically, the invention comprises, in combination:
1. Occupancy detection (13, 33-35, 38, 39);
2. Temperature limit detection (14);
3. Time cycle operation (32, 15);
4. Entry delay detection (16).

Referring to the drawings in general and to FIGS. 1 and 2 in particular, Device 10 is shown to be used in conjunction with external switching equipment 17, 18, and 19, for providing control signals to operate said equipment and accepting from said equipment, low voltage, direct current battery to operate Device 10. Device 10 does not replace the thermostatic control device 20 normally connected to such equipment 12, but is used in conjunction with the thermostat 20 to limit the use of the equipment 12. Device 10 is housed in a discrete enclosure separate from the above mentioned switching equipment 17, 18, and 19 and separate from the lighting, heating and air conditioning equipment, 11 and 12, respectively, and is connected thereto by a low voltage cable of four conductors 21A, 21B, 21C, and 21D.

Device 10 is mounted, for example, on the wall or the ceiling of the space under control so as to expose Device 10 to the environment of the monitored air (space) and the infrared radiations within the space.

The primary function of Device 10 is to sense the presence of a person within the room by means of passive infrared motion detection, thereby generating a control signal and allowing the lighting 11, heating and air conditioning units 12 to function in a normal manner, under manual and/or thermostatic control 20. Should the Device 10 not detect an occupant in the space, lighting will be disabled via the occupancy output signal and control of the heating and air conditioning will be carried on by the Temperature Limit Sensor 14 and Cycle Timer 15.

The Cycle Timer 15 function produces a control signal 22 that allows the heating and air conditioning equipment 12 to operate approximately eleven or twenty percent of the time, e.g., Off for one hour and on for either seven and one half or fifteen minutes. This function is provided to insure that the space under control does not become too warm or cold in the absence of an occupant, while allowing the space to drift above or below the setting on the thermostat 20.

The Temperature Limit Sensor 14 will override the Cycle Timer 15 should the temperature in the space exceed an upper or lower preset limit, thereby allowing the heating and air conditioning to function. This is a backup, safety feature, should the Cycle Timer 15 not be able to keep the space within the limits.

An auxiliary function 16 is provided, to disable the occupancy detector 13 while a door is open. Any doors wired to Device 10 by means of, form A, serial switches, that remain in the closed condition when the door is in the closed condition, must be closed for a preset length of time, before the occupancy detector 13 can initiate normal operation of the heating and air conditioning equipment 12. When the occupancy detector 13 is in the disabled condition, control again falls back to the cycle timer 15 and temperature limit sensor 20. The lighting control function 11 is unaffected by the entry delay detector 16.

A manual override function 23 is provided to operate the heating and air conditioning equipment 12 unconditionally with respect to Device 10.

Thermostat control circuit means 20 is operatively coupled to the heating and/or air conditioning unit(s) 12, via cables 24 and 25 and switching equipment 19.

The main power source 26 is operatively coupled to the heating and air conditioning equipment 12 via switch 18 and leads 27, 28.

The power source 29 for the lighting circuits 11 is operatively coupled to the lighting circuits 11 via switch 17 and leads 30, 31.

With particular reference now to FIG. 2, Device 10 is shown in block diagram as comprising: temperature limit sensor 14, cycle timer 15, power up reset 23, timer inhibit "OR" 32, entry delay detector 16, passive motion detector 13, bandpass filter and gain 32, lowpass filter and gain 33, threshold detector 34, occupancy latch 35, timeout control 36, reset "OR" 37, output "OR" 38, and output amplifier 39.

The individual circuit for the units shown in block diagram FIG. 2, will now be described in detail.

Figure 3:
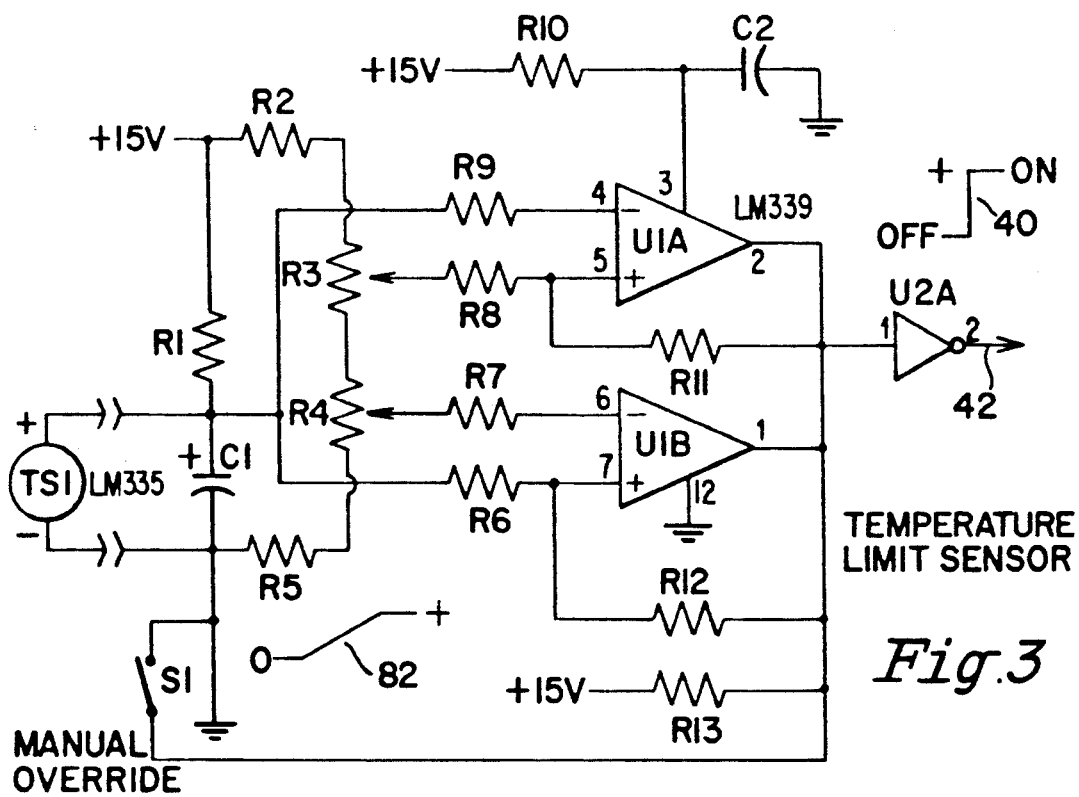
FIG. 3 is a circuit diagram of the temperature limit sensor utilized in accordance with the present invention.

With particular reference to FIG. 3, the circuit details of the Temperature Limit Sensor 14 is shown.

The Temperature Limit Sensor consists of a commercially available temperature sensor or thermostat like device TS1, operational amplifier (op-amp) U1A, U1B, U2A, resistors R1 Thru R13 and capacitors C1 and C2. TS1, in conjunction with resistor R1 and capacitor C1 provides a stable DC voltage output that is a linear function of temperature. This voltage is connected to the negative input of operational amplifier U1A, a differential voltage comparator, via resistor R9, and to the positive input of operational amplifier U1B, via resistor R7. Resistors R2 through R5 form a voltage divider that develops the reference voltages for the two differential comparators. The upper limit temperature is set by adjusting resistor R3 to the desired level. The wiper of resistor R3 is connected, via resistor R8 to the positive input of operational amplifier U1A. Should the output of TS1 rise above the level of voltage set at the wiper of resistor R3, indicating excessive temperature, the output of operational (differential) amplifier U1A will go to a logic "0", causing the output of inverter U2A to go to a logic "1". Likewise, should the voltage output of TS1 fall below the level of voltage set at the wiper of resistor R4, indicating insufficient temperature, the output of operational (differential) amplifier U1B will go to a logic "0". Since the outputs of operational amplifiers U1A and U1B are wire "ORed", the output of operational amplifier U2A will again go to a logic "1", which is the active output state of this function.

The manual override function 23 is applied to this circuit by closing switch S1. When S1 is closed, the outputs of operational amplifiers U1A and U1B are forced low, causing the output of inverter U2A to go to a logic "1". The output signal 40 of inverter U2A is coupled to input 41 of the timer inhibit "OR" circuit 32 and to the output "OR" circuit 38 via lead 42.

The Powerup Reset circuit 23 will now be described with reference to FIGS. 2 and 4.

The Powerup Reset 23 consists of resistor R14, capacitor C3 and inverter U2B. This circuit insures that upon the application of power to Device 10, either initially or after a power failure, that the occupancy latch 35 and cycle counter or timeout control 36 are reset to the off state. This diminishes possible damage to the heating and air conditioning equipment 12 due to short cycling in periods of intermittent power. The output signal 43 is coupled to the reset "OR" circuit 37 and the timer inhibit "OR" circuit 32 via leads 44 and 45, respectively.

The timer inhibit "OR" circuit 32 will now be described with reference to FIGS. 2 and 5.

The Timer Inhibit "OR" circuit 32 consists of a three input "OR" circuit U3B and causes the Cycle Timer 15 to be reset to the off state if the Temperature Limit Sensor 14, or Powerup Reset 23, or Occupancy Latch 35 are in the on state with a logic "1" output. This circuit causes the timer to be a secondary function to the above mentioned "ORed" functions. The output signal 46 of timer inhibit "OR" circuit 32 is coupled to cycle timer 15 via lead 47.

The Cycle Timer circuit 15 will now be described with reference to FIGS. 2 and 6.

The Cycle Timer circuit 15 consists of resistors R15, R16, R17, capacitors C4, C5, programmable timer/microprocess U4, flip/flop U5B and Jumper W1. The output 22 of the cycle timer is taken from the "Q" output of U5B and is always set to a logical "0" or off state upon reset of the Cycle Timer 15. Programmable timer U4 is a programmable timer integrated circuit wired to function in a free running mode, when the output of the Timer Inhibit 32 goes low. Programmable timer U4 will output a positive clock pulse signal 80 of width determined by the value of resistor R15 and capacitor C4. The period between clock pulses will be determined by the frequency of U4's oscillator, set by the values of resistor R17 and capacitor C5, and by the state of U4's program lines, pins 6, 9, 10, 11, 12. Because program line 10 and optionally, line 9, via jumper W1, are wired to the "Q-bar" output of toggle flip-flop U5B, the period between clock pulses is also determined by the state of flip-flop U5B. When flip-flop U5B is in the off state, "Q-bar" equal to logical "1", Programmable timer U4 will count long, i.e., count equal to 100%. When flip-flop U5B is clocked to the on state, Programmable timer U4's program line 10 and/or 9 go low, producing a short count, i.e., 12.5% or 25%. Thus as the Cycle Timer free runs, it will produce an "On" state, or logical "1" output, that is 12.5% or 25% as long as the "Off" state. The output signal 22 of the cycle timer 15 is connected to one input of the output "OR" circuit 38 via lead 48.

The Entry Delay detector circuit 16 will now be described with reference to FIGS. 2 and 7.

The Entry Delay Detector 16 is composed of switch S2, microprocessor U7, resistor R47 through R50, and capacitors C19 and C20. This circuit functions to inhibit the Occupancy Latch 35 given that the Occupancy Latch 35 is in the "Off" state and switch S2 is in the open condition. Under these conditions, microprocessor U7, a programmable timer, is reset via resistor R48 to produce a logical "0" output. This inhibits the Occupancy Latch 35 from being set to the on state in the presence of clock pulses generated by the Threshold Detector 34. When switch S2 is in the closed condition, a logical "0" is placed on the reset input of microprocessor U7, regardless of the state of the Occupancy Latch 35. This condition allows microprocessor U7 to run until its output goes high, at which time the oscillator of programmable timer U7 will be inhibited, locking up the output at a logical "1", and allowing the Occupancy Latch 35 to be clocked on. Once the programmable timer U7 is reset to a "0" output, the time required after switch S2 is closed, for a "1" output, is determined by the value of resistor R50 and capacitor C20 and by the state of the programmable timer U7 program lines pins 6, 9, 10, 11, and 12. This function allows for a person to enter the space for a short period of time and then leave without triggering the heating and air conditioning equipment 12 to the on condition via the occupancy detector 13.

The Passive Motion Detector 13 will now be described with reference to FIGS. 2 and 8.

The Passive Motion Detector 13 consists of MD1, a passive infrared motion detector, resistors R18, R20, capacitors C8 and C9. This device 13 is so wired as recommended by the manufacturers of said devices 13 and is widely published. Component values are variable for resistor R18 and capacitor C8, but the values recommended for resistor R20 and capacitor C9 are 100K ohms and 0.01 mfd, respectively. When wired as specified, a useful signal output 50 of about 600 micro volts peak to peak, in the range of 0.3 to 3 Hz will be obtained at the output. This signal is imbedded in a Gausian noise floor of about 300 micro volts peak to peak. There is also contained in this output signal 50 a thermal drift term that is generally larger than 600 micro volts peak to peak with a frequency that is generally below 0.1 Hz. This drift term requires a high pass filter 32 section to be applied at the output, via lead 51, of the motion detector 13.

The Bandpass Filter Plus Gain Circuit 32, will now be described with reference to FIGS. 2 and 9.

The Bandpass Filter Plus Gain section 32 is composed of operational amplifier U6A, resistors R19, R21, R22, and capacitors C7, C10 and C11. This is generally accepted as the optimal topology for this stage and is widely published. This circuit provides the highpass function required to reject the thermal drift term present in the motion detector 13 output 50, while also providing a pole of lowpass filtering to reject noise. Choice of circuit values is not extremely critical within certain limits. Capacitor C10 must be made as small as possible because of leakage induced DC gain. Because this circuit contains a zero, care in choosing resistor R22, capacitor C11 resistor R21 and capacitor C10 must be taken to insure that the notch frequency does not occur within the band of interest. Also, the gain at 60 Hz should be as low as possible to reduce induced noise. Analysis of the transfer function of the circuit, results in acceptable values of resistor R22=2.7 meg, resistor R21 -27K, capacitor C11=0.05 mFd and capacitor C10=10 mFd for the circuit. These values yield in band gain of 24 db, down about 1.75 db at 3 Hz, 60 Hz gain of 5.3 db and a lower 3 db corner at about 0.15 Hz. Output signal 52 is coupled via lead 53 to the Lowpass Filter and gain circuit 33.

Figure 10:
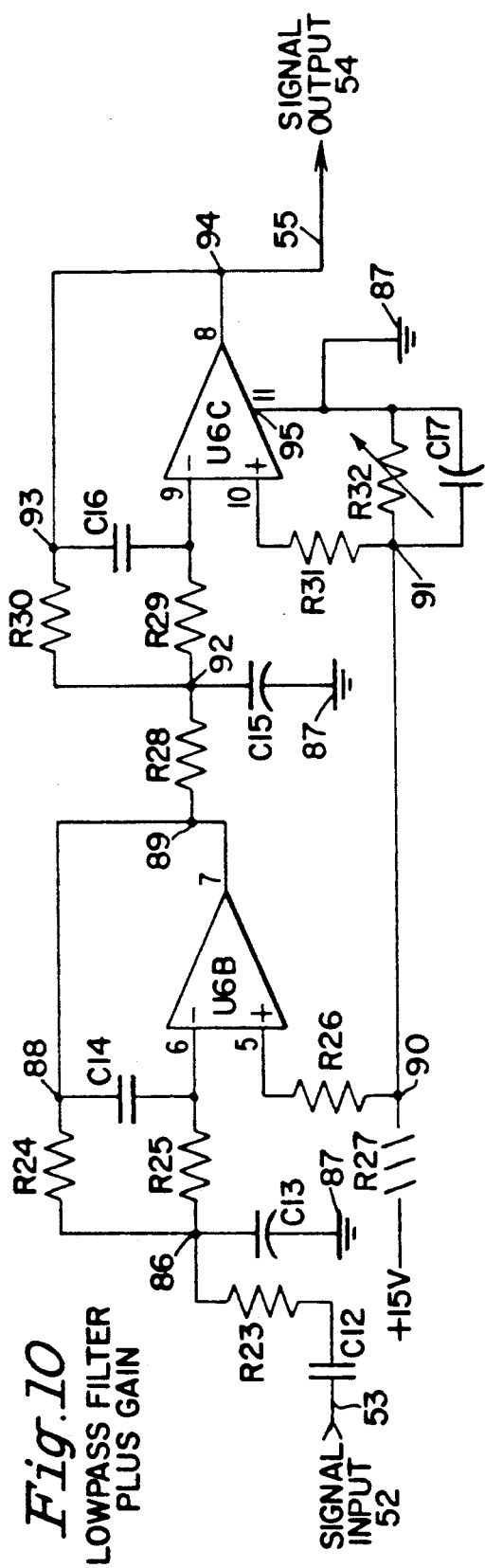
FIG. 10 is a circuit diagram of a lowpass filter plus gain utilized in accordance with the present invention.

The Lowpass Filter Plus Gain circuit 33, will now be described with reference to FIGS. 2 and 10.

This circuit is a fourth order, Chebyshev, lowpass, cascaded VCVS filter with 2 db ripple. The Lowpass Filter plus gain circuit 33 utilizes novel component values set forth below to achieve results unforeseen in the prior art, and to enable the present novel use of such a Lowpass Filter circuit as described herein. The signal gain of this circuit is adjustable to about plus 40 db with the gain bandwidth of standard op amps and choice of proper circuit values. The circuit consists of resistors R23 through R32, capacitors C12 through C17, and operational amplifiers U6B and U6C. Since the frequency band of interest is 0.3 to 3 Hz, ideally the 3 db corner should be placed near 3 Hz. This value will however yield impractical circuit values for that cutoff frequency if a large amount of gain is to be realized. Values for a practical circuit with a cutoff of 10 Hz and gain of 31 are as follows:

| R23 = 604K | C12 = 1 mFd |
| R24 = 3.6 meg | C13 = 0.22 mFd |
| R25 = 1 meg | C14 = 330 mFd |
| R28 = 224K | C15 = 0.22 mFd |
| R29 = 511K | C16 = 0.0068 mFd |
| R30 = 1.3 meg | C17 = 0.1 mFd |

Resistors R26, R27, R31 and R32 form a voltage divider to adjust the quiescent output voltage to ½ of Vcc.

The output signal 54 is coupled via lead 55 to the input of the Threshold Detector circuit 34.

The Threshold Detector circuit 34 will now be described with reference to FIGS. 2 and 11.

The Threshold Detector circuit 34 consists of operational amplifier U1C, U1D, and inverters U2C, U2D, U2E and U2F, Resistors R33-R41, R43. The purpose of this circuit is to produce a logic level clock pulse 56 to clock the Occupancy Latch 35 via lead 57, when an occupant in the space is detected. Operational amplifier U1D and U1C form a bidirectional threshold detector with wire "ORed" outputs. When the output 54 of the lowpass filter 33 exceeds the voltage limits, (V1<Vs<V2), set by the resistor network of resistors R33, R35, and R37, the outputs of operational amplifiers U1C and U1D go low, producing a positive going output pulse 50 and 56 at the output of both inverters U2C and U2D, respectively. The output of inverter U2C is wired, via lead 59, externally to equipment that operates a lighting circuit 16, while the output of inverter U2D is filtered by resistor R43 and capacitor C18 to limit false transitions caused by noise. The filtered pulse 56 is fed via inverters U2E and U2F to the Occupancy Latch 35 and to the Timeout Control 30, via lead 57, which it resets to zero count. A Light Emitting Diode (LED), LT1 is included in the load line of operational amplifiers U1D and U1C as an activity indicator.

The Occupancy Latch 35 will now be described with reference to FIGS. 2 and 12.

The Occupancy Latch 35 consists of U5A, a positive edge triggered "D" type flip-flop. If the output 60, via lead 68, of the Entry Delay Detector 16 is a logic "1" signal 60, and the output of the Reset "OR" 37 is a logic "0", and a positive going pulse 56 is produced by the Threshold Detector 34, the "Q" output of flip-flop U5A will switch from a logic "0" to a logic "1" on signal 61. A logic "1" on signal 61 output of flip-flop U5A will produce, via output "OR" 38 and output amp. 39, an on signal 62 condition at the HVAC control output 21A and 21B. The "Q-bar" output of flip-flop U5A functions as an inhibit signal for both the Entry Delay Detector 16 and the Timeout Control 36. When "Q-bar" is in the "0" state, the Entry Delay Detector 16 is inhibited from being reset. Thus, opening the door when the HVAC output 21A and 21B is in the on condition, will not cause it to short cycle the equipment. When "Q-bar" is in the "1" state, the Timeout Control 30 is inhibited, insuring that it starts to count only when the HVAC 50 goes to the on condition 62. The reset output 63 of the occupancy latch 35 is coupled to the timeout control 36, via lead 67.

Figure 13:
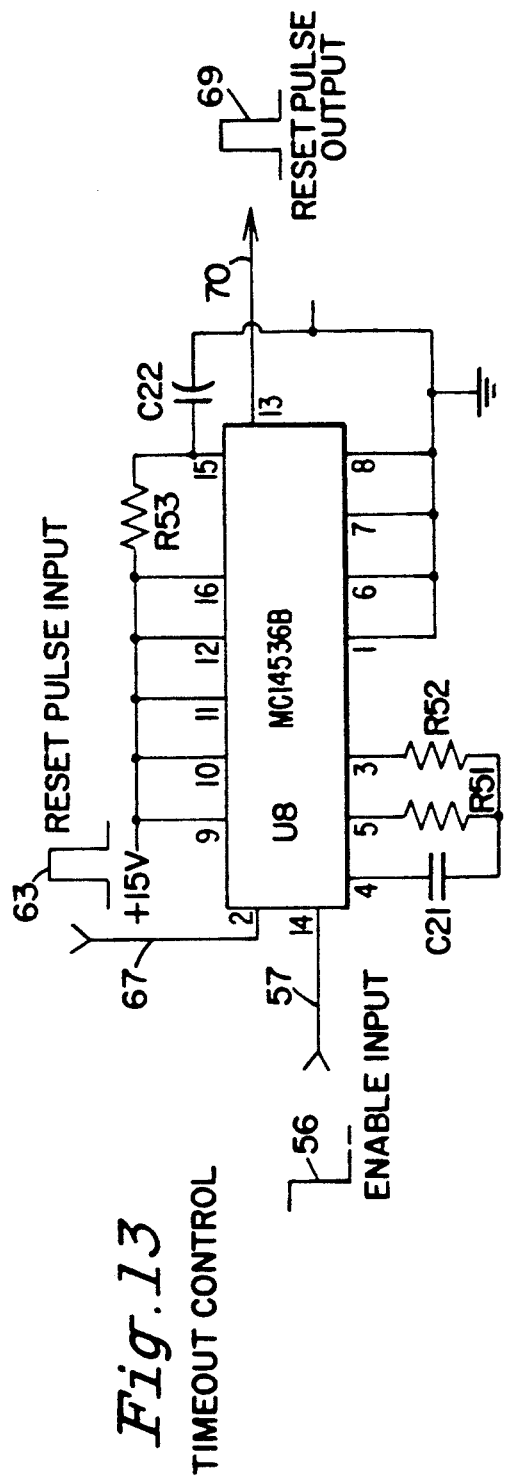
FIG. 13 is a circuit diagram of a timeout control utilized in accordance with the present invention.

The Timeout Control circuit 36, will now be described with reference to FIGS. 2 and 13.

When the Occupancy Latch 35 is in the "ON" state, U8, a programmable timer, is allowed to run. Programmable timer U8 produces a positive pulse of duration determined by resistor R53 and capacitor C22, after a period determined by resistor R51 and capacitor C21, plus the state of the program lines, pins 9, 10, 11, and 12. This positive pulse 69, via lead 70, resets 64 the Occupancy Latch 35 via lead 71, to the "OFF" state. Each clock pulse 56 produced by the Threshold Detector 34 will reset the Timeout Control 36 back to zero count, thus delaying the reset of the Occupancy Latch 35 a prescribed time after the last clock pulse, i.e., after the last detected occupant.

The Reset "OR" circuit 37, will now be described with reference to FIGS. 2 and 14.

This function is performed by the three input "OR" circuit U3C. It provides a reset pulse 64 to the Occupancy Latch 35 via lead 71, resetting it to the "OFF" state, when the Powerup Reset 23 signal 43 OR the Timeout Control pulses 69 go positively.

The Output "OR" circuit 38, will now be described with reference to FIGS. 2 and 15.

This function is performed by the three input "OR" circuit U3A and causes the HVAC control output signal 70 to be in the "ON" state when the output of the Occupancy Latch 35, OR the Temperature Limit Sensor 14, OR the Cycle Timer 15 is in the "ON" state. The output signal 71 is coupled to the input of the output amplifier 39 via lead 72. Lead 73 connects one input (5) of "OR" circuit U3A to the Q-output of the occupancy Latch 35. Lead 42 connects another input (3) of "OR" circuit U3A to the output of the temperature Limit sensor 14. Lead 48 connects the third input (4) of "OR" circuit U3A to the output of the cycle timer 15.

The Output Amplifier 33, will now be described with reference to FIGS. 2 and 16.

The Output Amp 33, basically comprises an operational amplifier U6D, and produces a logical "1", (+Vcc), or "ON" output state 54 to drive the external controls of the HVAC equipment, when provided a logical "1" input from the Output "OR" function 32.

I claim:

1. A supervisory control unit (10) having particular utility for controlling one or more lighting and heating and air conditioning circuit/equipment for a structure, comprising:

an occupant detection circuit means (13, 32, 33, 34, 35, 38, 39) for detecting the presence of one or more persons within the structure, and for providing a light activating signal (58) and/or an HVAC ON-signal (62) indicative thereof;

a cycle timer circuit means (15) operatively coupled (48, 73) to said occupant detection circuit means for enabling and disabling said occupant detection circuit means to generate said HVAC ON-signal (62) during one or more preselected duty cycle duration periods without the detecting of the presence of a person within the structure, so that excessive temperature variations within the structure is abridged during periods when the structure is unoccupied; and a temperature limit sensor circuit means (14) operatively coupled (42) to said occupant detection circuit means and to said cycle timer circuit means for overriding said cycle timer circuit means and to provide an enable signal (40) to effect generation of said HVAC ON-signal (62) when temperature within the structure exceeds an upper and lower preset limit.

2. A supervisory control unit as in claim 1, including:
an entry delay detection circuit means (16) operatively coupled (68) to said occupant detection circuit means for disabling generation of an HVAC ON-signal (62), when the door to the structure is in the open condition.

3. A supervisory control unit as in claim 1, wherein:
the occupant detection circuit means comprises a passive motion detector (13) connected (51) to a bandpass filter (32) operatively connected (53) to a lowpass filter (33) being connected (55) to a threshold detector (34).

4. A supervisory control unit as in claim 1, wherein:
the occupant detection circuit means comprises a passive motion detector (13) for providing an output signal (50) coupled (51) to an input of a bandpass filter (32), said bandpass filter being responsive to said output signal (50) for providing a bandpass signal (52) coupled (53) to an input of a lowpass filter (33), said lowpass filter being responsive to said bandpass signal for providing a lowpass signal (54) coupled to an input of a threshold detector (34), said threshold detector being responsive to said lowpass signal for providing a light activation signal (58), an occupancy latch (35) operatively coupled (57) to said threshold detector and being responsive to clock pulses (56) for effecting generation of said HVAC ON-signal (62).

5. A supervisory control unit as in claim 1, wherein:
the lowpass filter (33) comprises an input (53) connected to one side of a capacitor (C12), the other side of said capacitor (C12) being connected to one end of a resistor (R23) having its other end connected to a first circuit junction (86), said first circuit junction being connected to one end of a second resistor (R24) and a third resistor (R25) and a second capacitor (C13), the other end of the said second capacitor (C13) being coupled to a circuit ground potential (87), the other end of the said second resistor (R24) being connected to a second circuit junction (88), said second circuit junction(88) being connected to one end of a third capacitor (C14) and a third circuit junction (89), the other ends of said third capacitor (C14) and said third resistor (R25) being connected to a negative (−) input of a first operational amplifier (U6B), a fourth resistor (R27) having a first end coupled to a voltage source and a second end connected to a fourth circuit junction (90), said fourth circuit junction (90) being connected to one end of a fifth resistor (R26) and a fifth circuit junction (91), the other end of the fifth resistor (R26) being connected to the positive (+) input of said first operational amplifier (U6B), said first operational amplifier (U6B) having an output connected to said third circuit junction (89), a sixth resistor (R28) having one end connected to said third circuit junction (89) and its other end connected to a sixth circuit junction (92), said sixth circuit junction (92) being connected to one end of a seventh and eighth resistor (R29, R30) and one end of a fourth capacitor (C15), the other end of said fourth capacitor (C15) being coupled to a circuit ground potential (87), the other end of the eighth resistor (R30) being connected to a seventh circuit junction (93), said seventh circuit junction (93) being connected to one end of a fifth capacitor (C16) and to an eighth circuit junction (94), the other ends of said fifth capacitor (C16) and said seventh resistor (R29) being connected to a negative (−) input of a second operational amplifier (U6C), a ninth resistor (R31) having one end connected to said fifth circuit junction (91) and its other end connected to a positive (+) input of said second operational amplifier (U6C), said second operational amplifier (U6C) having an output connected to said eight circuit junction (94), said fifth circuit junction (91) being connected to one end of a tenth resistor (R32) and a sixth capacitor (C17), the other ends of said tenth resistor (R32) and said sixth capacitor (C17) being connected to a feedback input (95) of said second operational amplifier (U6C) and to said circuit ground (87), said eighth circuit junction (94) being connected to an output lead (55).

6. A supervisory control unit as in claim 5, wherein:
the lowpass filter (33) being comprised of components having approximate electrical circuit values as listed below:

Resistor (R23)=604K ohm Capacitor (C12)=1 MFD

Resistor (R24)=3.6 meg.ohm Capacitor (C13)=0.22 MFD

Resistor (R25)=1 meg.ohm Capacitor (C14)=330 MFD

Resistor (R28)=224K ohm Capacitor (C15)=0.22 MFD

Resistor (R29)=511K ohm Capacitor (C16)=0.0068 MFD

Resistor (R30)=1.3 meg.ohm Capacitor (C17)=0.1 MFD,

7. A supervisory control unit as in claim 1, wherein:
the cycle timer circuit means (15) comprises a free running programmable timer (U4) providing a clock pulse signal (80) having a preset width and being coupled (81) to the clock input (CK) of a toggle flip-flop (U5B), said toggle flip flop being responsive to said clock pulse signal for providing a cycle timer signal 22.

8. A supervisory control unit as in claim 1, wherein:
the temperature limit sensor circuit means (14) comprises a temperature sensing device (TS1) for providing a stable direct current voltage signal (82) being a linear function of the temperature within the structure, a differential voltage comparator (U1A, U1B) being responsive to said signal (82) and to a preset voltage value for generating a control override signal (40), said control override signal (40) being operatively coupled to said occupant detection circuit means for effecting generation of a HVAC ON-signal (62).

9. An on/off discrete control circuit for a heating unit and an air conditioning unit and a light fixture to control the environment within a room with detection of a person, in combination, comprising:
an occupant detector means which includes a passive motion detector (13) operatively coupled to a bandpass filter and gain circuit (34) operatively coupled to a lowpass filter and gain circuit (33) operatively coupled to a threshold detector (34) operatively coupled to an occupancy latch (35) and a timeout control circuit (36), said occupancy latch being operatively coupled to an entry delay detector (16) and a timer inhibit OR circuit (32) and an output OR circuit (38) and to said timeout control circuit (36), said timeout control circuit (36) being operatively coupled to a reset OR circuit (37), said reset OR circuit (37) being operatively coupled to said occupancy latch (35), an output OR circuit (38) operatively coupled between an output of said occupancy latch (35) and an output amplifier (39), for providing a HVAC ON-signal (62) and a light activating signal (58) with detection of a person within the room;
a cycle timer means (15, 32) operatively coupled to said occupant detector means for enabling and disabling said occupant detector means generation of said HVAC ON-signal for a predetermined duty cycle;
a temperature limit sensor means (14) operatively coupled to said occupant detector means and to said cycle timer means (15, 32) for effecting generation of said HVAC ON-signal (62) with detection of a temperature exceeding a predetermined upper and lower limit with the room; and a powerup reset circuit (23) operatively coupled to said cycle timer means and to said reset OR circuit (37).

10. A supervisory control unit as in claim 9, wherein:
the lowpass filter 33 comprises an input (53) connected to one side of a capacitor (C12), the other side of said capacitor (C12) being connected to one end of a resistor (R23) having its other end connected to a first circuit junction (86), said first circuit junction being connected to one end of a second resistor (R24) and a third resistor (R25) and a second capacitor (C13), the other end of the said second capacitor (C13) being coupled to a circuit ground potential (87), the other end of the said second resistor (R24) being connected to a second circuit junction (88), said second circuit junction(88) being connected to one end of a third capacitor (C14) and a third circuit junction (89), the other ends of said third capacitor (C14) and said third resistor (R25) being connected to a negative (−) input of a first operational amplifier (U6B), a fourth resistor (R27) having a first end coupled to a voltage source and a second end connected to a fourth circuit junction (90), said fourth circuit junction (90) being connected to one end of a fifth resistor (R26) and a fifth circuit junction (91), the other end of the fifth resistor (R26) being connected to the positive (+) input of said first operational amplifier (U6B), said first operational amplifier (U6B) having an output connected to said third circuit junction (89), a sixth resistor (R28) having one end connected to said third circuit junction (89) and its other end connected to a sixth circuit junction (92), said sixth circuit junction (92) being connected to one end of a seventh and eighth resistor (R29, R30) and one end of a fourth capacitor (C15), the other end of said fourth capacitor (C15) being coupled to a circuit ground potential (87), the other end of the eighth resistor (R30) being connected to a seventh circuit junction (93), said seventh circuit junction (93) being connected to one end of a fifth capacitor (C16) and to an eighth circuit junction (94), the other ends of said fifth capacitor (C16) and said seventh resistor (R29) being connected to a negative (−) input of a second operational amplifier (U6C), a ninth resistor (R31) having one end connected to said fifth circuit junction (91) and its other end connected to a positive (+) input of said second operational amplifier (U6C), said second operational amplifier (U6C) having an output connected to said eight circuit junction (94), said fifth circuit junction (91) being connected to one end of a tenth resistor (R32) and a sixth capacitor (C17), the other ends of said tenth resistor (R32) and said sixth capacitor (C17) being connected to a feedback input (95) of said second operational amplifier (U6C) and to said circuit ground (87), said eighth circuit junction (94) being connected to an output lead (55).

11. A supervisory control unit as in claim 9, wherein:
the lowpass filter (33) being comprised of components having approximate electrical circuit values as listed below:

Resistor (R23)=604K ohm Capacitor (C12)=1 MFD

Resistor (R24)=3.6 meg.ohm Capacitor (C13)=0.22 MFD

Resistor (R25)=1 meg.ohm Capacitor (C14)=330 MFD

Resistor (R28)=224K ohm Capacitor (C15)=0.22 MFD

Resistor (R29)=511K ohm Capacitor (C16)=0.0068 MFD

Resistor (R30)=1.3 meg.ohm Capacitor (C17)=0.1 MFD

12. A supervisory control unit as in claim 9, wherein: the cycle timer circuit means (15) comprises a free running programmable timer (U4) providing a clock pulse signal (80) having a preset width and being coupled (81) to the clock input (CK) of a toggle flip-flop (U5B), said toggle flip flop being responsive to said clock pulse signal for providing a cycle timer signal 22.

13. A supervisory control unit as in claim 9, wherein: the temperature limit sensor circuit means (14) comprises a temperature sensing device (TS1) for providing a stable direct current voltage signal (82) being a linear function of the temperature within the structure, a differential voltage comparator (U1A, U1B) being responsive to said signal (82) and to a preset voltage value for generating a control override signal (40), said control override signal (40) being operatively coupled to said occupant detection circuit means for effecting generation of a HVAC ON-signal (62).

* * * * *